Apr. 3, 1923.                L. E. ARMENTROUT                1,450,347
                         TROLLEY AND FEED WIRE CLAMP
                              Filed Jan. 3, 1923
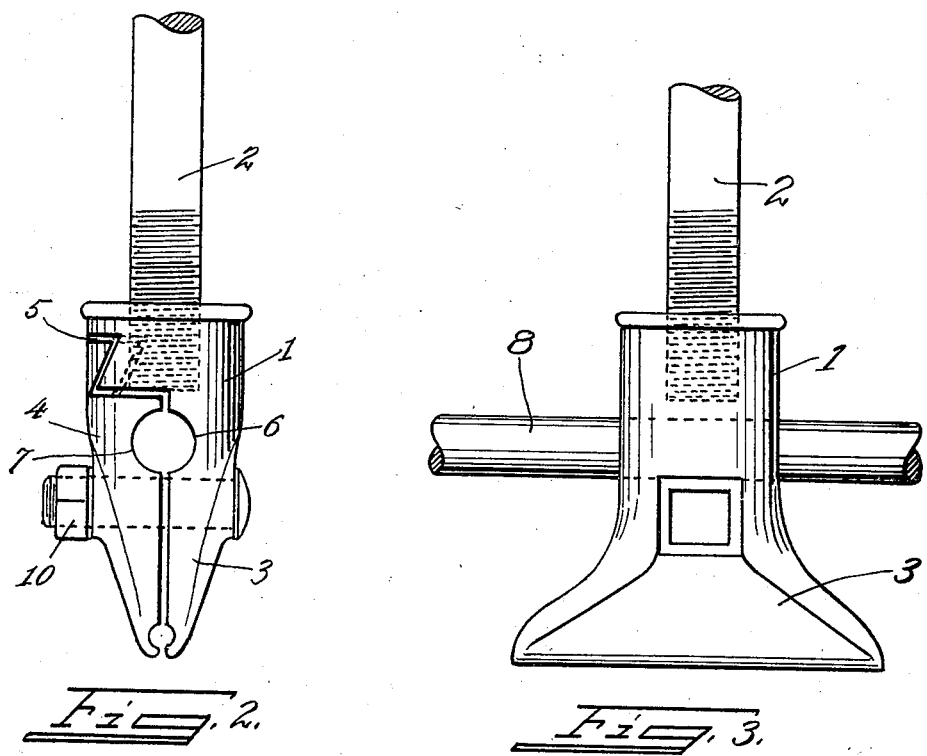
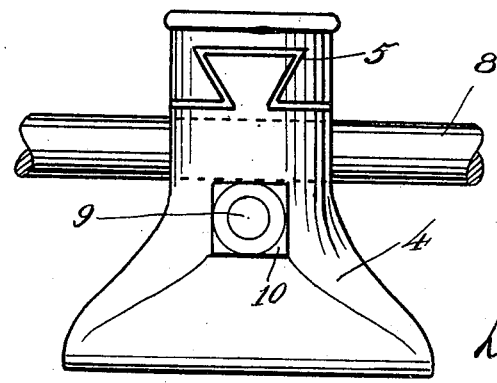
INVENTOR:
Luther E. Armentrout
BY Allen & Allen
ATTORNEYS.

Patented Apr. 3, 1923.

1,450,347

UNITED STATES PATENT OFFICE.

LUTHER E. ARMENTROUT, OF BORDERLAND, WEST VIRGINIA.

TROLLEY AND FEED WIRE CLAMP.

Application filed January 3, 1923. Serial No. 610,508.

*To all whom it may concern:*

Be it known that I, LUTHER E. ARMENTROUT, a citizen of the United States, residing at Borderland, in the county of Mingo and State of West Virginia, have invented certain new and useful Improvements in Trolley and Feed Wire Clamps, of which the following is a full, clear, and exact description, reference being had to the accompanying drawings, forming part of this specification.

My invention relates to clamps such as are employed to suspend trolley and feed wires from the roof of mines for conveying the electric current to electrical mine car locomotives and the like.

As usually constructed separate sets of suspension hangers or clamps are employed for the trolley wire, and for the feed wire supplying current thereto, with separate insulators for both wires and the necessary expansion bolts and labor of installation.

It is my object to furnish a construction of clamp which shall be adapted to support and carry one or both of these wires as desired, thus cutting down the expense of clamps and of installation, and also saving the cost of additional insulators and drilling holes in the roof.

This object is attained by my novel construction of clamp as hereinafter set forth and claimed.

In the drawings:

Figure 1 is a front elevation of my improved clamp.

Figure 2 is an end elevation and

Figure 3 a rear elevation.

The body of the clamp comprises preferably a cylindrical shank 1 with a central threaded opening for the stud bolt 2 by means of which the clamp is suspended from the mine roof. The shank is spread out laterally below to provide one member 3 of the clamp for the trolley wire and is cut away centrally to receive the other member 4 of the clamp which is similarly shaped. The shank portion is formed with a dovetailed groove 5 and the second clamp member with a corresponding dovetailed tenon to fit the groove and to suspend the clamp plate therein. The two clamp members are provided with corresponding semi-circular grooves 6, 7, which together provide a circular opening for the passage and support of the feed wire 8. The two members are also provided with corresponding openings in line with each other at right angles to the feed wire grooves. The opening in one member is squared and in the other circular, the one to receive the squared shank and the other the threaded end of the bolt 9 which receives the nut 10 by means of which the clamp members are drawn and held tightly together. The lower elongated ends of the clamp members are also formed with corresponding grooves of a proper size to receive and hold the trolley wire.

With this construction the clamp members support both the feed wire and the trolley wire.

The shank of the clamp is screwed upon the stud bolt and the feed wire and the trolley wire are seated in the respective grooves therein. The clamp plate 4 is then located in place and suspended and held by the tenon in the dovetailed groove and the bolt 9 is tightened to clamp the two wires in place.

Having thus described my invention, what I claim and desire to secure by Letters Patent, is:—

A clamp for the purpose specified comprising a shank portion screw threaded to receive the suspension bolt, a depending clamp portion extended laterally with semi-circular grooves to receive the feed wire and the trolley wire and a clamp plate provided with corresponding grooves, and means for clamping the two together, the clamp plate and shank being correspondingly mortised and tenoned to hold the clamp plate during the tightening of the clamp.

LUTHER E. ARMENTROUT.